Jan. 24, 1950 J. G. BAKER 2,495,565
CENTRIFUGALLY TUNED LATERAL VIBRATION ABSORBER
Filed July 3, 1946 4 Sheets-Sheet 1

INVENTOR.
John G. Baker
BY Ernest D. Given
ATTORNEY

Patented Jan. 24, 1950

2,495,565

UNITED STATES PATENT OFFICE 2,495,565

CENTRIFUGALLY TUNED LATERAL VIBRATION ABSORBER

John G. Baker, Evansville, Wis., assignor to United Aircraft Corporation, East Hartford, Conn., a corporation of Delaware Application July 3, 1946, Serial No. 681,217

9 Claims. (Cl. 170—159)

This invention relates to vibration absorbers adapted for use with aircraft propellers and has for its object to absorb or suppress deleterious vibrations having a lateral component.

Another object of the invention is to provide a simple and efficient centrifugal type lateral vibration absorber which may be made in a compact unit and readily applied to existing propellers without changing the construction of the propeller itself.

Still another object is to provide a vibration absorber of the foregoing type having novel and improved details of construction and features of operation.

Various other objects and advantages will be apparent as the nature of the invention is more fully disclosed.

Although the novel features which are characteristic of this invention are set forth more in detail in the claims appended hereto, the nature and scope of the invention may be better understood by referring to the following description, taken in connection with the accompanying drawings forming a part thereof, in which a specific embodiment has been set forth for purposes of illustration.

In the following description, certain specific terms are used for convenience in referring to the various details of the invention. These terms, however, are to be interpreted as broadly as the state of the art will permit.

Figure 1:
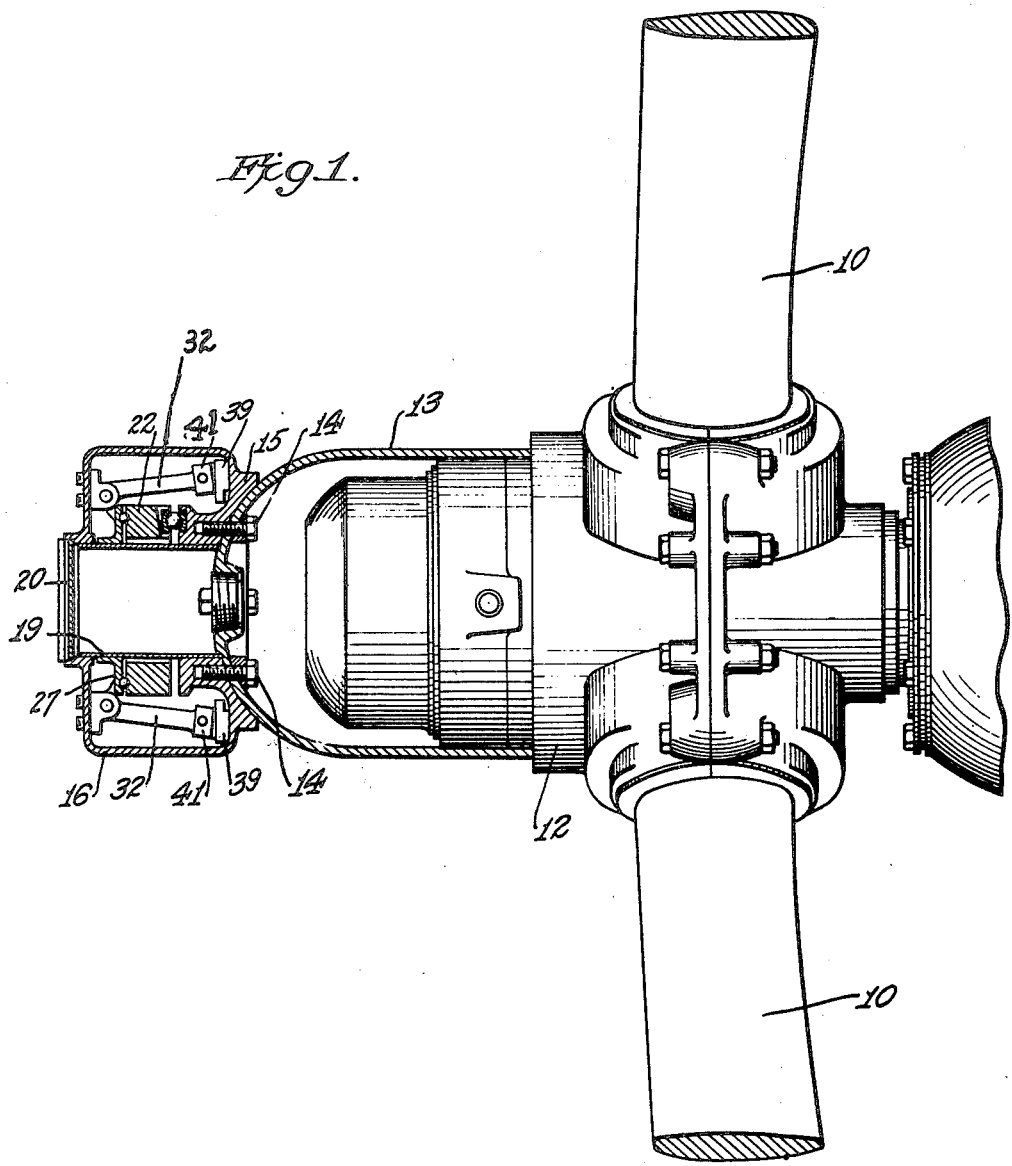
Figure 1 is an elevational view of an aircraft propeller to which is applied a lateral vibration absorber embodying the present invention, the latter being shown in section.

In the drawings, Fig. 1 shows a controllable pitch aircraft propeller comprising a plurality of blades 10 which are secured to the central hub 12 in conventional manner. The propeller has a dome or spinner 13 to which the lateral vibration absorbing mechanism of the present invention is secured as by bolts 14.

Figure 2:
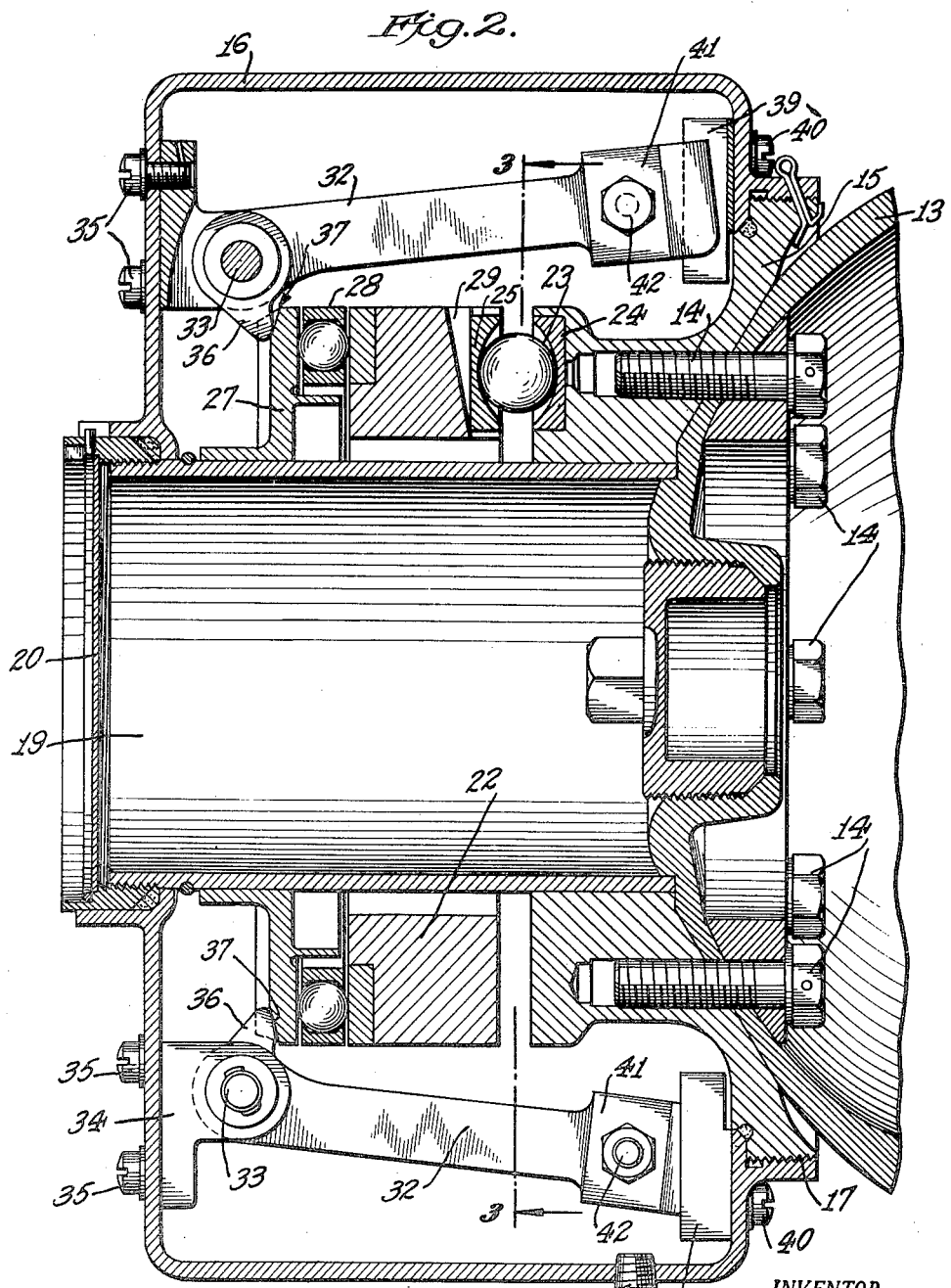
Fig. 2 is an enlarged longitudinal sectional view of the vibration absorbing device shown in Fig. 1, same being taken on line 2—2 of Fig. 4.
Figure 3:
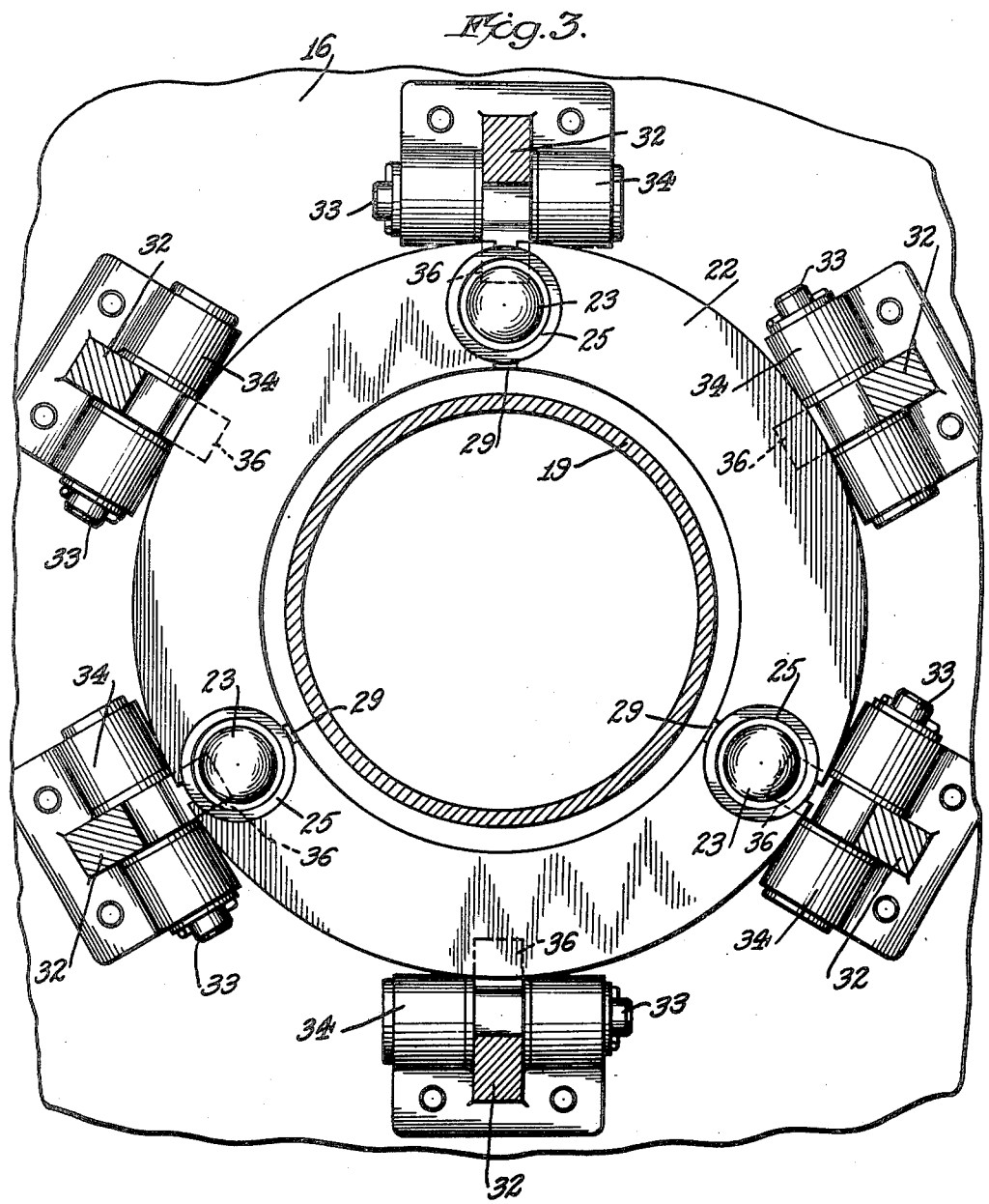
Fig. 3 is a transverse section taken on line 3—3 of Fig. 2.

In the embodiment illustrated, the vibration absorbing unit is mounted in a housing comprising a rear wall 15 shaped to conform to the contour of the dome 13 to which it is bolted, an outer casing 16 threaded to the wall 15 at 17 and containing a drain vent 18 for lubricating oil, and an inner cylindrical wall 19 in axial alignment with the propeller hub 12 and having a front closure 20 secured to said wall 19 as best shown in Fig. 2. The entire vibration absorbing unit, therefore, rotates with the dome 13 of the propeller.

Figure 4:
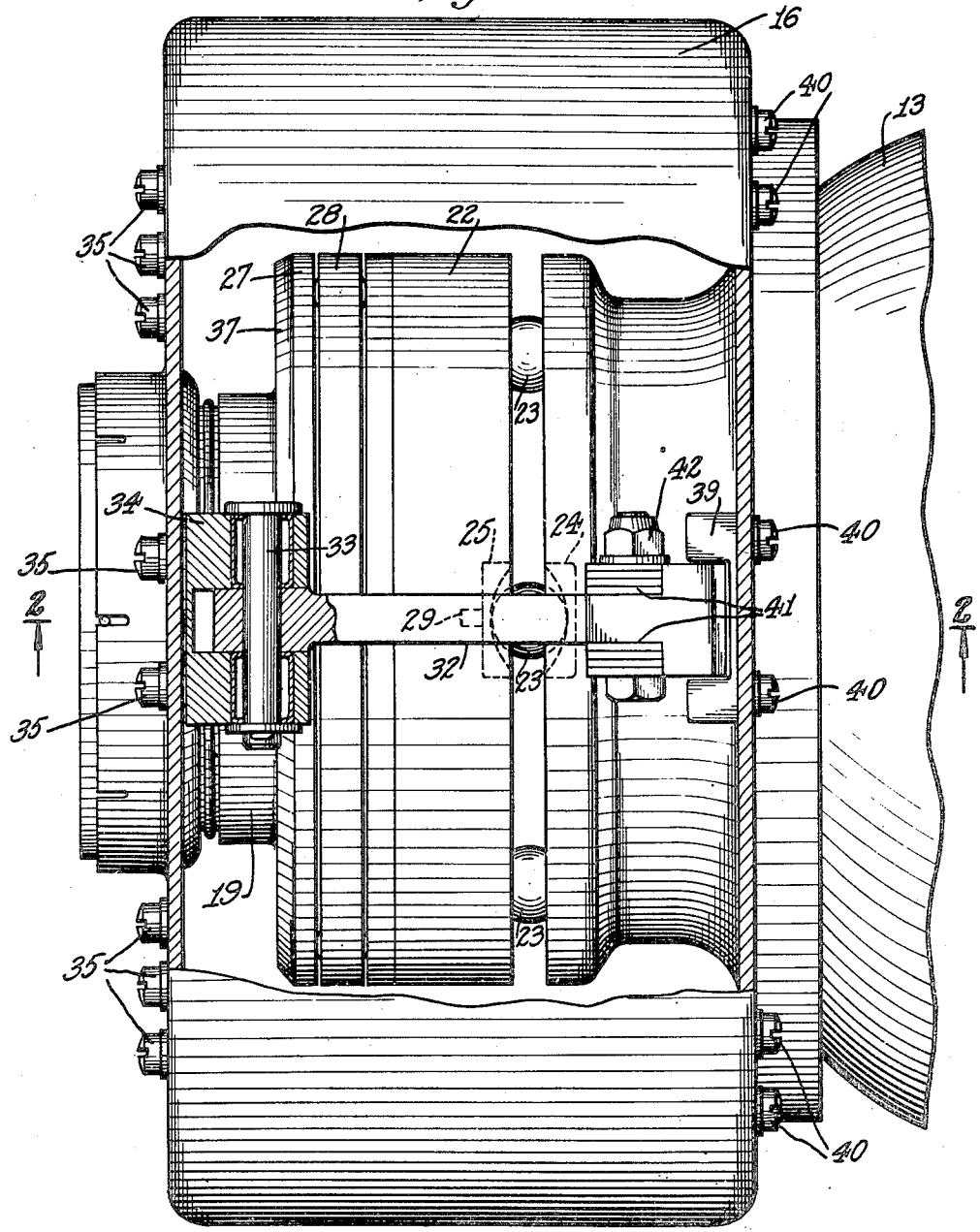
Fig. 4 is a plan view of the device shown in Fig. 2, with a portion of the casing broken away to show the interior.

The lateral vibration absorbing mechanism includes a floating ring member 22 which freely surrounds the inner cylindrical wall 19 of the unit housing. The mounting members which suspend the ring 22 in place comprise, on one annular face of said ring, a plurality of circumferentially spaced ball bearing members, here shown to be three in number, each including a ball 23 seated between a shallow concave button 24 in the rear wall 15 of the housing and a shallow flat button 25 in the adjacent face of the ring 22; and, on the other annular face of said ring, a thrust member 27 slidably mounted on the inner cylindrical wall 19 of the housing and carrying a ball race 28 engaging said ring 22, as best shown in Figs. 2 and 4. In the embodiment illustrated, grooves 29 are provided in the ring 22 to permit the insertion of wedges to remove the buttons 25 when required.

A plurality of circumferentially spaced centrifugal arms or bell-cranks 32 are pivoted by pintles 33 to bearings 34 secured by bolts 35 to the outer casing 16, and are provided with lugs 36 engaging the outer face of thrust member 27 which is tapered at 37 for sliding engagement with said lugs 36. The centrifugal arms 32 act as a restoring force, proportional to the square of the speed, for recentering the floating ring 22. In the embodiment illustrated, the centrifugal arms are six in number, equally spaced about the circumference of thrust member 27, although the number and arrangement of said arms may be varied as desired.

The outer end of each centrifugal arm 32 is guided in a frame or bracket 39 secured as by bolts 40 to the outer casing 16, permitting said arms to pivot upon their pintles 33 but restraining transverse motion thereof which would otherwise result from rotation of the propeller. The arms 32 are loaded adjacent their outer ends with shims 41 secured thereto by bolts 42, the number and weight of said shims depending upon the requirements of any given installation. The shims 41 adjust the centrifugal force on the arms 32 for any given installation. By these adjustments the natural frequency of the absorber, which is determined by the relative values of the arm centrifugal force transmitted to thrust member 27 and the mass of ring member 22, may be made to correspond with vibrations at any selected multiple of propeller rotational speed.

In operation, the floating ring 22 is restrained from lateral motion through the above described lever system by means of which centrifugal forces provide a restoring effect proportional to lateral displacement. Lateral motion may be defined as any periodic path of a point at the absorber location in a plane normal to the propeller shaft. Lateral propeller-engine vibrations transmitted to my vibration absorbing unit will generally take the form of circular motions around the shaft center line, and as a result the balls 23 will roll in their seats at a constant radius from the centers of the seats. Hence there will be little or no axial movement of the ring 22 or pivotal movement of the weighted arms 32 during the absorber action. The ring 22 and its associated lever system are designed to vibrate as an undamped centrifugally tuned absorber, under the influence of lateral vibrations, providing reaction forces in opposition to such vibrations.

An important feature of my vibration absorber is that it is tuned to a multiple of propeller speed rather than to a fixed frequency, this being accomplished by the use of arms 32 which, acted upon by centrifugal force, apply a restoring force to the absorber mass 22 such that the natural frequency of this mass in lateral vibration is always proportional to rotational speed.

Another important feature is that this device, as a centrifugally tuned absorber, permits the incorporation of a large absorber mass which can move with considerable amplitude at high frequency without the necessity for large supporting members. In a conventional crankshaft damper in which a puck is carried in a concave seat at a distance from the axis of rotation of the crankshaft, the centrifugal force on the puck is considerable and must be borne by the bearing between the puck and the concave race on which it travels. If more mass were desired in the puck, this would increase the centrifugal force acting on the race. My vibration absorber, on the other hand, has only the centrifugal force of the counterweights acting upon it. Its mass is substantially at the center line of the propeller shaft; hence an increase in mass or the weight of ring member 22, if such an increase were desired, would not alter the centrifugal force acting on the supporting recess as substantially the entire centrifugal force acting on the races is produced by the counterweights or shims 41.

Although a specific embodiment has been shown and described herein for purposes of illustration, it will be evident to those skilled in the art that the invention is capable of various modifications and adaptations within the scope of the appended claims.

What is claimed is:

1. A lateral vibration absorber for an aircraft propeller arranged for rotation about a predetermined axis, comprising a casing rotatable with said propeller, a floating ring in said casing capable of vibrating laterally of said axis, means for causing said ring to move longitudinally of said axis in response to any lateral movement thereof, a thrust member movable longitudinally of said axis in said casing and arranged to exert force parallel to said axis on an annular face of said ring, and centrifugally actuated means in said casing opposing movement of said thrust member longitudinally of said axis to restrain motion of said ring longitudinally of said axis and hence movement thereof laterally of said axis with a restoring force proportional to the lateral displacement of said ring.

2. A lateral vibration absorber for an aircraft propeller arranged for rotation about a predetermined axis, comprising a casing rotatable with said propeller, a floating ring in said casing capable of moving laterally of said axis, a thrust member movable longitudinally of said axis in said casing and arranged to exert force parallel to said axis on one annular face of said ring, spaced bearings including balls seated in shallow concave buttons in said casing and engaging surfaces rigid with said ring, and centrifugal arms pivoted on said casing and engaging said thrust member to oppose movement thereof longitudinally of said axis.

3. A lateral vibration absorber for an aircraft propeller arranged for rotation about a predetermined axis, comprising a casing rotatable with said propeller, a cylinder coaxial with said propeller and located in and rigid with said casing, a floating ring surrounding said cylinder and capable of moving laterally of said axis in respect to said cylinder, a thrust member slidable on said cylinder and arranged to exert force parallel to said axis on one annular face of said ring, spaced bearings including balls seated in shallow concave buttons in said casing and engaging surfaces rigid with said ring, and means in said casing responsive to centrifugal force to oppose axial movement of said thrust member.

4. A lateral vibration absorber for an aircraft propeller arranged for rotation about a predetermined axis, comprising a casing rotatable with said propeller, a cylinder coaxial with said propeller and located in and rigid with said casing, a floating ring surrounding said cylinder and capable of moving laterally of said axis in respect to said cylinder, a thrust member slidable on said cylinder and arranged to exert force parallel to said axis on one annular face of said ring, spaced bearings including balls seated in shallow concave buttons in said casing and engaging surfaces rigid with said ring, and centrifugal arms pivoted on said casing and having portions engaging said thrust member to oppose lateral motion of said ring.

5. The combination with an aircraft propeller arranged for rotation about a predetermined axis, of a lateral vibration absorber, comprising a casing secured to and rotatable with said propeller, a cylinder in and rigid with said casing disposed in axial alignment with said propeller, a floating ring surrounding said cylinder and capable of moving laterally of said axis, a thrust member slidable axially on said cylinder and arranged to exert force parallel to said axis on one annular face of said ring, spaced bearings including balls seated in shallow concave buttons in said casing and engaging surfaces rigid with said ring, and centrifugal means carried by and movable in respect to said casing under the influence of centrifugal force for applying force to said thrust member to oppose lateral vibrations of said ring.

6. The combination with an aircraft propeller arranged for rotation about a predetermined axis, of a lateral vibration absorber, comprising a casing secured to and rotatable with said propeller, a cylinder in and rigid with said casing disposed in axial alignment with said propeller, a floating ring surrounding said cylinder and capable of moving laterally of said axis, a thrust member slidable axially on said cylinder and arranged to exert force parallel to said axis on one annular face of said ring, spaced bearings including balls seated in shallow concave buttons in said casing and engaging surfaces rigid with said ring, and centrifugal arms pivoted on said casing and engaging said thrust member to oppose lateral vibrations of said ring.

7. The combination with an aircraft propeller having a spinner, of a lateral vibration absorber rigidly secured to said spinner and comprising a casing, a cylinder in and rigid with said casing in axial alignment with said propeller, a floating ring surrounding said cylinder and capable of moving laterally of the axis of said propeller and said cylinder, a thrust member slidable axially on said cylinder and arranged to exert force parallel to the axis of said cylinder on one annular face of said ring, spaced bearings including balls seated in shallow concave buttons in said casing and engaging surfaces rigid with said ring, and spaced centrifugal arms pivoted on said casing and having portions engaging said thrust member to oppose lateral vibrations of said ring.

8. The combination with an aircraft propeller having a spinner, of a lateral vibration absorber rigidly secured to said spinner and comprising a casing, a cylinder in and rigid with said casing in axial alignment with said propeller, a floating ring surrounding said cylinder and capable of moving laterally of the axis of said propeller and said cylinder, a thrust member slidable axially on said cylinder and arranged to exert force parallel to the axis of said cylinder on one annular face of said ring, spaced bearings including balls seated in shallow concave buttons in said casing and engaging surfaces rigid with said ring, spaced centrifugal arms pivoted on said casing and having portions engaging said thrust member to restrain lateral motion of said ring, and means for adjusting the restraining action of said arms.

9. The combination with an aircraft propeller having a spinner, of a lateral vibration absorber rigidly secured to said spinner and comprising a casing, a cylinder in and rigid with said casing in axial alignment with said propeller, a floating ring surrounding said cylinder and capable of moving laterally of the axis of said propeller and said cylinder, a thrust member slidable axially on said cylinder and arranged to exert force parallel to said axis on one annular face of said ring, spaced bearings including balls seated in shallow concave buttons in said casing and engaging surfaces rigid with said ring, and spaced centrifugal arms pivoted on said casing and having portions engaging said thrust member to restrain lateral motion of said ring, a plurality of removable weights on each of said arms, and means for removably supporting said weights on said arms to control their restraining action.

JOHN G. BAKER.

REFERENCES CITED

The following references are of record in the file of this patent:

UNITED STATES PATENTS

| Number | Name | Date |
| --- | --- | --- |
| 1,641,230 | Manville | Sept. 6, 1927 |
| 2,186,199 | Martin | Jan. 9, 1940 |
| 2,225,929 | Sarazin | Dec. 24, 1940 |
| 2,370,880 | Rubissow | Mar. 6, 1945 |

FOREIGN PATENTS

| Number | Country | Date |
| --- | --- | --- |
| 360,045 | Italy | June 10, 1938 |